United States Patent [19]

Slabach, Jr.

[11] 4,365,985

[45] Dec. 28, 1982

[54] METHOD OF PRESS BENDING A PAINTED GLASS SHEET

[75] Inventor: John C. Slabach, Jr., Crestline, Ohio

[73] Assignee: PPG Industries, Inc., Pittsburgh, Pa.

[21] Appl. No.: 250,961

[22] Filed: Apr. 1, 1981

[51] Int. Cl.³ .............................................. C03B 23/03
[52] U.S. Cl. ...................................... 65/106; 65/103; 65/273
[58] Field of Search .......................... 65/103, 106, 273

[56] References Cited

U.S. PATENT DOCUMENTS 2,570,309 10/1951 Black ....................................... 65/273
3,169,900 2/1965 Ermlich ............................... 161/149
3,256,080 6/1966 Vranken ................................ 65/103
3,346,358 10/1967 Thomas ................................. 65/106
4,260,409 4/1981 Reese et al. ............................ 65/273

Primary Examiner—Arthur D. Kellogg
Attorney, Agent, or Firm—Donald Carl Lepiane; Edward I. Mates

[57] ABSTRACT

Engage a glass sheet having a painted border portion on one surface between press bending molds of different outline size in such a manner as to avoid having either mold contact the painted border portion and stick to the paint to distort the shaped glass on retracting the molds.

5 Claims, 3 Drawing Figures

METHOD OF PRESS BENDING A PAINTED GLASS SHEET

BACKGROUND OF THE INVENTION

1. Field of the Invention

Glass sheets are curved to fit the overall shape of a vehicle in which they are mounted. In recent years, in an effort to reduce the overall weight of automobiles to promote improved efficiency in terms of mileage per gallon of fuel consumed, the stationary windows of the automobile have been bonded to the mounting frames by a technique known as flush glazing. A peripheral border of opaque paint is applied to hide the ugly portions of the frame to which the shaped window is mounted.

It is easier to apply a border of paint to the peripheral portion of a flat glass sheet than to a peripheral portion of a curved glass sheet. Consequently, it has become customary to bake a painted border onto the surface of the flat glass sheet to which it is applied while heating the glass sheet to a deformation temperature before a solid member shapes the softened sheet during further processing. However, the paint is quite likely to stick on contact with the cover of a press bending mold used to shape the glass sheet, when the solid member is disengaged from the painted border portion.

It is customary in the art of press bending glass sheets to suspend a flat glass sheet from tongs which grip the sheet at its upper edge portion. The tongs are mounted on an overhead carriage which moves through a heating furnace, thereby conveying a glass sheet through the furnace. The time it takes the glass to traverse the furnace is coordinated with the heat delivered within the furnace to insure that the glass sheet is heated to a temperature sufficient for shaping. The deformation temperature of glass normally ranges from about 1040° F. (560° C.) to about 1110° F. (600° C.). Where the glass is also to be tempered in addition to being shaped, it is desirable to obtain surface temperatures on the order of 1200° F. (650° C.) to about 1250° F. (675° C.) before the glass sheet is shaped and, immediately thereafter, cooled rapidly enough to impart a desired temper to the glass sheet.

It has been conventional in the past to press bend glass sheets to desired shapes by engaging the entire opposite major surfaces of the glass sheet between a pair of press bending molds. A desirable press bending mold is depicted in U.S. Pat. No. 3,367,764 to Samuel L. Seymour. Another conventional mold construction involves a pair of shaping frames of complementary shapes that engage the opposite glass sheet surfaces at their marginal portions as in U.S. Pat. No. 3,256,080 to Jean Vranken. Also, glass sheets have been press bent using a combination of a continuous male mold that engages one major surface over its entire area and a frame mold that engages the opposite major surface at its marginal portion only. Inherently, such molds would engage a painted border portion during a glass shaping operation.

When glass sheets having painted borders are heated to temperatures needed for tempering, the paint sticks to the surface of the mold or the cover for the mold used to impress the shape into the heat-softened glass sheet. Furthermore, when the press bending molds retract from one another to permit the shaped glass sheet to be removed from the press bending station, the sticking of the peripheral portion of the painted glass sheet to one mold facing that painted glass sheet surface causes the sheet to be pulled out of shape until the one mold separates completely from the painted surface of the glass sheet. When the other surface of the glass sheet is free of paint, the glass sheet and other mold separate much more readily from one another, thereby leaving only the painted glass surface engaging the one mold, and causing the glass sheet to pivot about an axis defined by the tong gripping points. It would be inconvenient to apply paint to both major surfaces of the glass in order to attempt to equalize the sticking effect between the opposite surfaces in an effort to prevent the glass sheet from being distorted from its desired shape as the press bending molds retract.

2. Description of Patents of Interest

U.S. Pat. No. 3,169,900 to John R. Ermlich discloses a technique for pressing glass sheets wherein an opposite pair of press bending molds engage the opposite surfaces of tong suspended glass sheets in such a manner that the marginal portion of the glass is exposed. Such exposure causes the marginal portion of the glass sheet to develop a desired compression stress. The glass treated in this patent is completely free of any paint.

U.S. Pat. No. 3,346,358 to Dean L. Thomas discloses a method of press bending vertically suspended glass sheets using a pair of press bending molds having fabric covers over concave and convex shaping surfaces. The lower edge of a mold having the concave shaping surface is offset upwardly from the lower edge of the mold having the convex shaping surface so that its fabric cover rubs against the major surface of the glass sheet rather than along the bottom corner line formed at the intersection of the major surface of the glass sheet that faces the concave mold and the bottom edge surface of the glass sheet. Therefore, the purpose of the patent of Thomas is to reduce wear of the mold cover due to rubbing the mold cover for the concave shaping mold relative to a sharp corner of a glass sheet.

SUMMARY OF THE INVENTION

According to the present invention, a glass sheet painted on the border of one major surface only is shaped between a pair of press bending molds of complementary curvature in a shaping station. The mold facing the major surface having a painted border portion has smaller outline dimensions than the outline dimensions of the other mold facing the other major surface and the molds are constructed and arranged to move against the opposite surfaces of the glass sheet in such a manner that the side edges and the lower edge portions of the painted border portion are entirely outside of the smaller mold but the corresponding clear border portion of the opposite major surface is engaged by the other mold when shaping takes place. Thus, when the molds are separated from one another after engaging a glass sheet for shaping, the glass sheet does not stick selectively on its side edges or lower edge of its painted major surface to the mold that faces the painted major surface and the glass sheet is not distorted from the desired shape by virtue of the selective sticking of the glass sheet to the mold that faces the painted surface.

In a specific embodiment of the present invention where a glass sheet is shaped to a shape having a convexly shaped major surface and a concavely shaped major surface, the concavely curved major surface of the glass sheet being painted along its border, the smaller press bending mold is one that has a convex shaping surface and the mold that engages at least substantially the entire extent of the outline of the opposite sheet surface has a larger outline.

Both of the shaping molds may be of the so-called continuous extent type wherein the entire shaping surface is formed of a rigid shaping plate covered with a suitable cover of a refractory material such as fiber glass cloth, preferably obtained by knitting textured yarn in the manner disclosed in U.S. Pat. No. 3,148,968 to James H. Cypher et al. However, the present invention may also be employed using a relatively small convex press bending mold having a shaping surface of relatively small extent of convex configuration together with a concave press bending mold comprising a frame-like member having an outline shaping surface rather than a continuous surface of concave configuration so long as the inner margin of the frame-like member overlies tha marginal edge of the smaller convex press bending mold when the molds engage a glass sheet for shaping, and the outer margin of the frame-like member lies beyond the vertical side edges and below the bottom edge of the glass sheet to be shaped.

In either embodiment, a portion of the glass sheet within its painted border portion is engaged between the press bending molds. This opposing engagement helps shape the glass sheet to its desired shape even when the marginal edge portion of the sheet is engaged on one side only by the mold of larger extent.

The benefits of the present invention will be understood better in the light of a description of a specific embodiment which follows:

BRIEF DESCRIPTION OF THE DRAWINGS

In the drawings that form part of a description of a preferred embodiment of the present invention.

DESCRIPTION OF THE PREFERRED EMBODIMENTS

Figure 3:
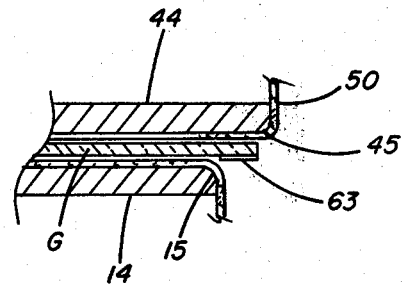
FIG. 3 is a further enlarged sectional view taken along the line 3—3 of FIG. 2 showing how the corresponding side edges of the molds are constructed and arranged relative to a painted side edge portion of a glass sheet to be shaped during a press bending operation.

Referring to the drawings, the apparatus according to the present invention comprises a male press bending mold 10 having a generally convex configuration facing one side of a glass sheet and a female press bending mold 12 having a generally concave configuration facing the other side of the glass sheet. The male press bending mold 10 comprises a shaping plate 14 of relatively flexible configuration yet sufficiently thick to be more rigid than the glass sheet G to be shaped thereby. The flexible shaping plate 14 has a beveled side edge 15 as shown in FIG. 3. The bottom edge of the shaping plate 14 is similarly beveled.

Behind the shaping plate is a reinforcing plate 16 that is thicker and more rigid than the shaping plate 14. A plurality of adjustable connectors 18 interconnect the rear surface of the shaping plate 14 and the reinforcing plate 16 so as to enable local adjustments in the shape of the shaping plate 14 in the direction of its thickness by altering the distance between corresponding connected localized portions of the shaping plate relative to the corresponding portions of the relatively rigid reinforcing plate 16.

The shaping plate 14 is covered with a mold cover 20 preferably made of fiber glass fabric which is most preferably formed by knitting textured yarn. The cover is preferably composed of one or more layers of stretchable knit fiber glass fabric as disclosed in U.S. Pat. No. 3,148,968 of James H. Cypher and Clement E. Valchar. The cover 20 is secured in unwrinkled condition against the outer surface of the shaping plate 14 by means of a series of clamps 22 that grip the marginal portion of the mold cover 20 against the reinforcing plate 16.

Behind the reinforcing plate 16 is a plate assembly 24 connected thereto by a plurality of connectors 26. The plate assembly 24 is connected to a piston rod 28 that extends horizontally from an essentially horizontally oriented piston housing 30. The piston rod moves relative to the piston housing to actuate movement of the male press bending mold 10 between a recessed position spaced from the female press bending mold 12 and a glass engaging position. The piston housing is mounted near its forward end on a pivot mounting 32 and the pivoted relation of the piston housing is adjusted by means of a vertical piston 34 whose lower end is supported on a pivot support 36 and whose upper end engages piston housing 30 near the rearward end of the latter.

Several tongs 38 are used to grip the upper edge of the glass sheet G to be supported between the male female press bending molds 10 and 12. A preferred tong construction is shown in U.S. Pat. No. 3,089,727 to William J. Hay, Jr. Each of the molds is provided with a number of tong receiving slots 40 (see FIG. 2) which are aligned with corresponding slots 40 of the other mold so as to permit the tongs to be received within a pair of aligned slots to support a glass sheet G in gripped realtion while it is supported in a shaping position between said molds where it is shaped by engagement between the pair of complementary press bending molds. The tongs are suspended from carriages (not shown) and the latter are moved by a conveyor to a tong position that corresponds to the shaping position for the glass sheet when the molds are retracted, held in that position while the molds engage the glass sheet to shape the latter, and retract to permit the shaped glass sheet to leave the shaping station. The conveyor then moves the carriage to another station for further processing.

The female press bending mold 12 is similar in construction to that of the male press bending mold 10 except for the fact that its flexible shaping plate 44 is of concave configuration, of approximately the same thickness as and larger in extent than the shaping plate 14 of the male press bending mold. The flexible shaping plate 44 has bevelled side edges 45 and a bevelled bottom edge (not shown). Shaping plate 44 is connected to a reinforcing plate 46 similar to the reinforcing plate 16 of the male pressing mold using adjustable connectors 48 similar to the adjustable connectors 18 of the male mold. A cover 50 similar to cover 20 is supported in unwrinkled relation against the concave shaping surface of the female pressing mold and is suitably attached to the reinforcing plate 46 by clamps 52. The female mold 12 also has a plate assembly 54 (only a portion of which is shown) interconnected to the reinforcing plate 46 by a plurality of connectors 56 for actuation by a piston (not shown) similar to piston 28 for the other mold. The glass sheet G that faces the male mold has one side painted along its border to include a bottom edge portion 61, a pair of side edge portions 63 and an upper edge portion 65.

Figure 1:
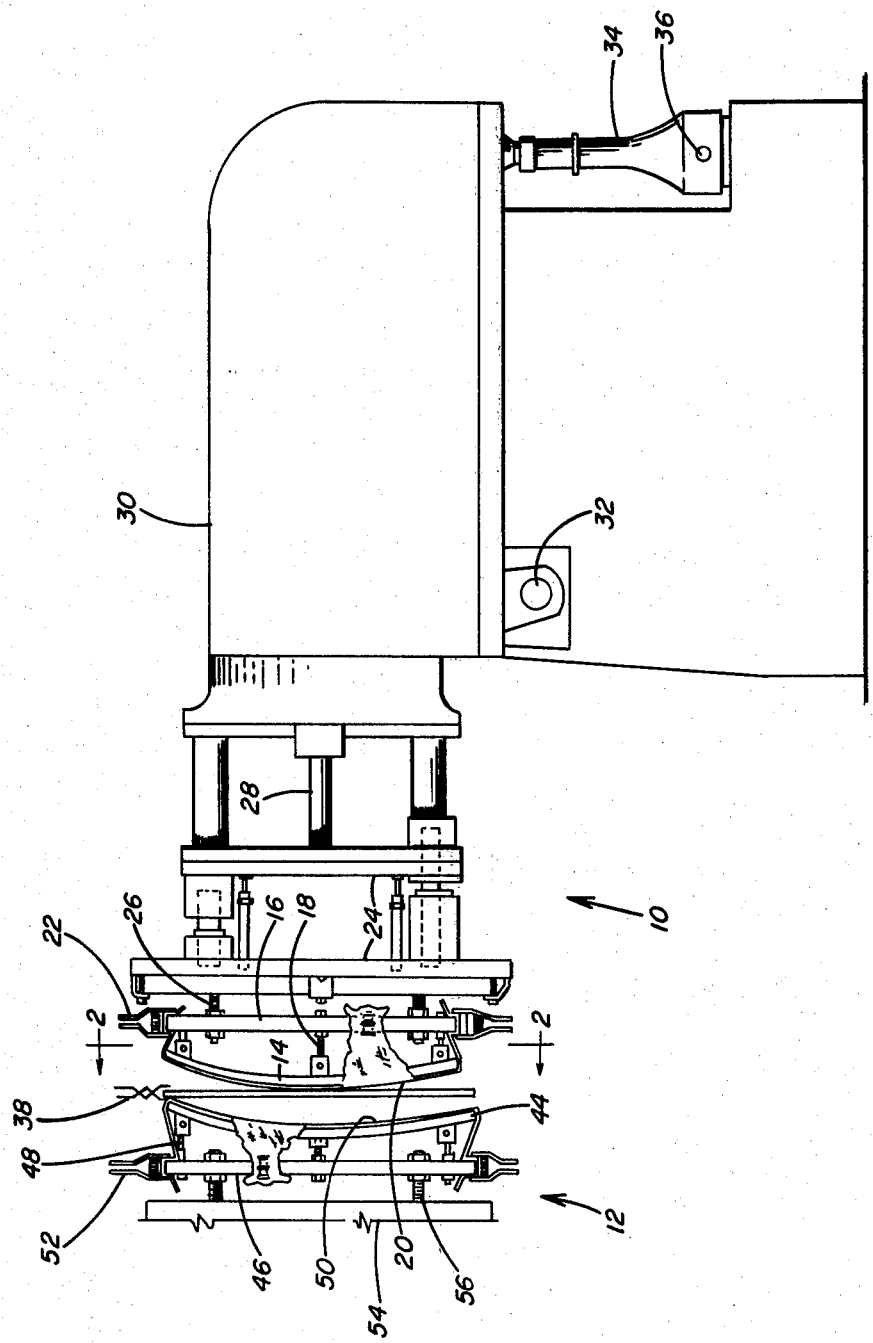
FIG. 1 is a side view of a portion of a press bending station showing a relatively small press bending mold having a shaping surface of convex configuration with actuating means attached thereto mounted in facing relation to a press bending mold of larger outline size and of concave configuration shown without its actuating mechanism.
Figure 2:
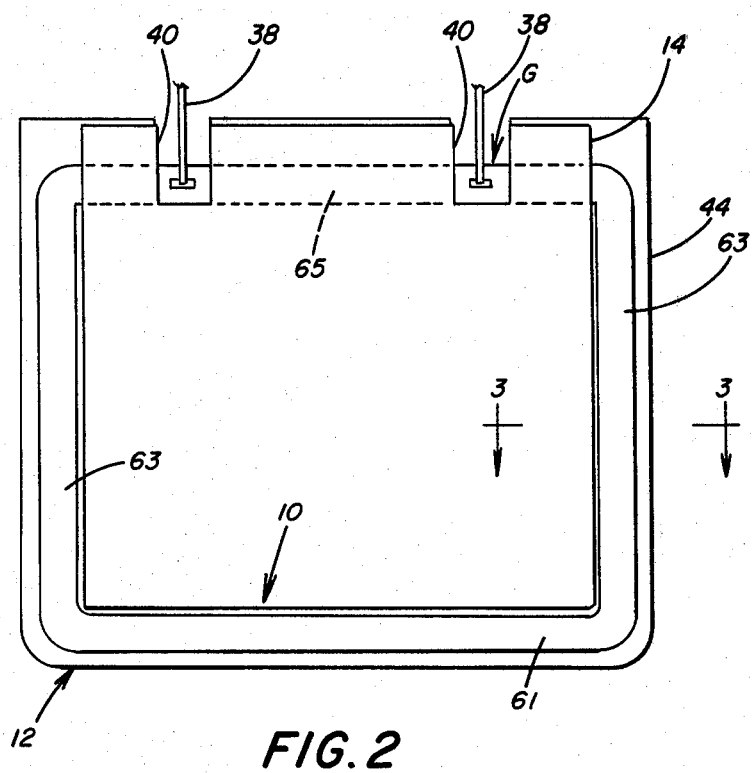
FIG. 2 is an enlarged elevational view taken along the line 2—2 of FIG. 1, showing the relative size of a glass sheet having a painted border portion and the outline of the pair of shaping molds between which the glass sheet is engaged during its shaping.

As seen particularly in FIGS. 2 and 3, when the glass sheet G is engaged between the flexible shaping plate 14 of the male mold 10 and the flexible shaping plate 44 of the female mold 12, the painted side edge portions 63 are located beyond the vertical side edges of the shaping plate 14 whose major surface engages the major surface of the glass sheet G inside its side edge portions 63. It is also noted from FIG. 2 that the bottom edge of the male mold 10 is above the upper edge of the bottom edge portion 61 of the painted border that extends around the perimeter of the glass sheet.

The female mold engages the entire unpainted major surface of the glass sheet G and extends beyond the outer edge of the glass sheet. Thus, the molds 10 and 12 simultaneously engage the opposite major surfaces of the glass sheet within the painted edge and bottom border portions to press bend the glass into a desired shape. However, neither mold contacts a painted portion of the glass except for the uppermost painted portion 65 which is in the region also engaged by the tongs 38 that grip the upper edge portion of the glass sheet.

Thus, when the molds separate from one another after engaging a glass sheet to shape the latter, only the upper edge portion 65 of the painted border has a chance to stick against the male mold while the remainder of the painted border including the painted side portions 63 and the painted bottom portion 61 are not aligned with any portion of either mold that is in contact therewith during the shaping of the glass sheet. There is almost no net vertical lever arm in the upper painted edge portion gripped by the tongs when the molds separate from one another because the tongs engage the upper painted border portion approximately midway between its upper and bottom boundary. The male mold is out of contact with the side edge portions and bottom edge portion of the painted border portion where the lever action is more due to the greater vertical distance from the level at which the tongs grip the glass sheet, where the tendency of the glass sheet to become distorted, particularly along its bottom edge, would be increased due to the male mold sticking to the bottom and side edge portions of the painted border after the female mold separates from the unpainted surface of the shaped sheet.

When the molds 10 and 12 engage the glass sheet to shape the latter, the upper edges of their shaping plates are approximately aligned with one another while the side edges of the male mold are offset inwardly from the corresponding side edges of the female mold and the lower edge of the male mold is offset vertically from the lower edge of the female mold when the glass sheet to be shaped has a painted border extending along the surface to be shaped to a concave configuration. Should it be desired to shape a glass sheet to a configuration where the surface having a painted border is to be shaped to a convex configuration and an unpainted opposite surface is shaped to a concave configuration, it is understood that the female mold will have the side edges of its shaping plate offset inwardly of the corresponding side edges of the shaping plate of the male mold and its bottom edge offset upwardly from the bottom edge of the shaping plate of the male mold. In other words, the present invention provides that the mold that faces a surface having a painted border portion be shorter and narrower than the mold that faces an unpainted surface and that the shorter, narrower mold be offset inwardly and upwardly from the corresponding side edges and bottom edge of the larger mold. Preferably, the smaller mold is recessed within the larger outline mold by a distance approximately 1 to 3 millimeters more than the width of the painted border.

It is understood that the female mold 12 of the illustrative embodiment representing a continuous shaping surface interrupted only by tong receiving notches may be replaced by a frame-like member whose outer marginal edge is larger and outside the outer marginal edge of the glass sheet and whose inner marginal edge is sufficiently within the perimeter of the male mold to provide enough engagement against both sides of the glass sheet to cause the glass sheet to be shaped to a desired configuration, particularly when the glass sheet is bent to a relatively simple bend such as a cylindrical configuration.

The specific embodiment of the present invention and its alternate modifications thereof just described represent illustrative preferred embodiments of the present invention. It is understood that various changes other than those enumerated previously may be made without departing from the gist of the invention as defined in the claimed subject matter which follows.

I claim:

1. A method of shaping a glass sheet having a painted border portion around the perimeter of one major surface thereof including a pair of painted side edge portions and a painted bottom edge portion comprising the steps of:
    (a) heating said glass sheet to an elevated temperature sufficient for shaping,
    (b) supporting the heated glass sheet along its top edge by tongs between a pair of press bending molds having shaping surfaces of substantially complemental shape and different outline sizes,
    (c) engaging said press bending molds against the opposite major surfaces of said heated glass sheet to change the shape of said sheet,
characterized by engaging said painted major surface having a painted border portion with said mold of smaller outline size and the opposite major surface with said mold of larger outline size, whereby, when said molds are engaged, none of the painted border portion along said side edge portions and said bottom edge portion of said painted major surface comes into contact with either press bending mold.

2. The method as recited in claim 1, wherein said mold of larger outline size engages the entire area of said other major surface while said mold of smaller outline size engages the painted major surface within the side edge portions and the bottom edge portion of the painted border portions.

3. The method as recited in claim 2, wherein a mold having a convex configuration engages said major surface having a painted border portion and a mold having a concave configuration engages said other major surface.

4. The method as recited in claim 1 or claim 2 or claim 3, wherein said glass sheet has an upper painted border portion comprising using said tongs to grip said upper painted border portion.

5. The method as in claim 4, wherein said tongs engage said upper painted border portion approximately midway between the upper and lower edges of said upper painted border portion.

* * * * *